Sept. 8, 1936.     S. A. FORTER     2,053,902
METHOD OF AND APPARATUS FOR MELTING GLASS
Filed April 21, 1932
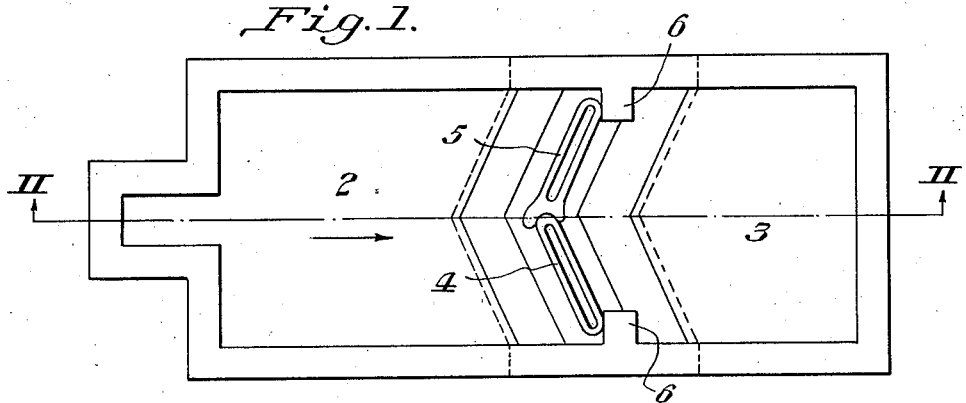
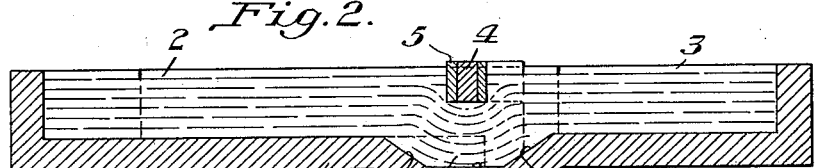
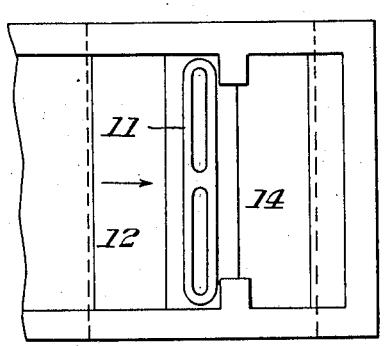
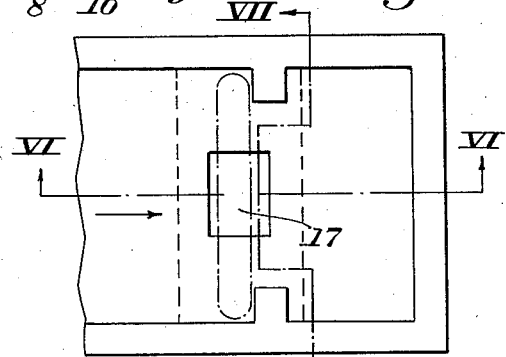
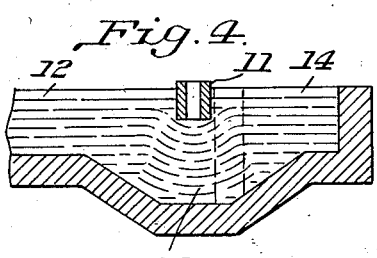
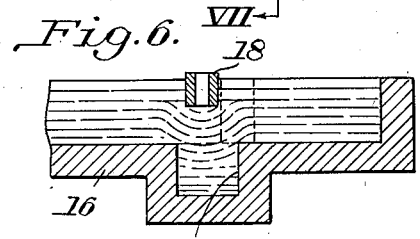
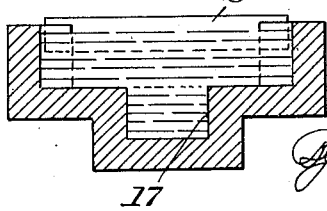
INVENTOR
Samuel A. Forter Patented Sept. 8, 1936

2,053,902

UNITED STATES PATENT OFFICE 2,053,902

METHOD OF AND APPARATUS FOR MELTING GLASS

Samuel A. Forter, Bellevue, Pa., assignor to H. L. Dixon Company, Pittsburgh, Pa., a corporation of Pennsylvania Application April 21, 1932, Serial No. 606,592

6 Claims. (Cl. 49—54)

The present invention relates broadly to the art of glass working, and more particularly to a method of and apparatus for maintaining a body of glass in the desired condition for effective working.

At the present time there is a tendency in the art of glass working to construct furnaces which are considerably shallower than furnaces ordinarily used. In making such shallow furnaces it has heretofore been customary to utilize the usual bridge wall, and provide a restricted opening below the bridge wall through which the glass flows from the melting chamber to the refining chamber. In actual practice, such a construction has been subject to a great many practical difficulties not only with respect to the glass temperature in the refining chamber, but by reason of substantion devitrification due to the flow conditions which have been necessitated.

It is one of the objects of the present invention to provide a shallow tank or furnace of the general character referred to, but of improved construction such that the desired operating conditions are insured without impairing either the quality of the glass or the temperature thereof in the refining chamber.

In the accompanying drawing I have shown for purposes of illustration only, certain preferred embodiments of the present invention. In the drawing—

Figure 1 is a top plan view of a melting tank constructed in accordance with the present invention;

Figure 2 is a longitudinal sectional view on the line II—II of Figure 1;

Figure 3 is a view similar to Figure 1, illustrating a portion of a modified form of melting tank;

Figure 4 is a sectional view on the line IV—IV of Figure 5;

Figure 5 is a view similar to Figure 3, illustrating another form of my invention, the floater being removed for sake of clearness;

Figure 6 is a sectional view on the line VI—VI of Figure 5 with the floater shown in position; and Figure 7 is a transverse sectional view on the line VII—VII of Figure 5.

It will be understood that the present invention is not concerned with the particular manner of heating the glass in the tank, or with the roof structure of the tank. In the drawing therefore the tank itself is shown, it being understood that the additional features required to provide a complete structure may be of any desired construction.

The tank shown in Figures 1 and 2 comprises a melting chamber 2, which is herein shown as being relatively shallow as compared to usual tank structures, and a refining chamber 3 of similar depth. Intermediate the melting and refining chambers I have illustrated a bridge wall made up of floaters 4 and 5 of more or less conventional construction. This construction is known also as a bridge, and is held in place by suitable offsets or projections 6 formed on the sides of the tank.

The bottom 7 of the tank is of special construction in the zone intermediate the chambers 2 and 3, this construction being illustrated in Figure 2 as comprising a ditch or trough 8, preferably of the general contour of the floaters in a direction across the tank, and having sloping or inclined side walls 9 joining the bottom 10 of the trough with the main bottom of the tank.

In accordance with the preferred embodiment of my invention, the depth of the trough or ditch 8 is preferably such as to provide a glass depth below the bridge wall or floaters 4 and 5 substantially equal to the glass depth in the melting and refining chambers, although absolute uniformity in these respects is not essential. Where substantial uniformity exists, however, the glass flow is not materially restricted either by reason of the vertical height of the flow zone below the floaters, or by reason of the transverse width of the flow zone between the floater projections 6. This makes it possible to obtain a free flow of glass from the melting chamber into the refining chamber throughout substantially the entire area of the tank zone, thus obviating channeling and devitrification of the glass, such as characteristic of a restricted flow zone, and enabling the hot upper portion of the glass in the melting chamber to enter the refining chamber.

In Figures 3 and 4 there is shown a somewhat similar construction in which the bridge wall comprises a single floater 11 between the melting chamber 12 and the refining chamber 14. Below the floater, which in this case extends directly across the tank, there is provided a transversely extending trough or ditch 15 having characteristics similar to those before described and such that the desired free flow of glass from one chamber to the other is insured.

While I have heretofore described and illustrated my invention as applicable particularly to constructions in which a free flow throughout substantially the entire width of the tank is desired, the invention is well adapted to modified or special flow paths as illustrated for example in Figures 5, 6 and 7 wherein the bottom 16 of the tank is provided with an intermediate recess 17 throughout a portion only of the tank width and underlying a floater 18. With such a construction there is a relatively restricted flow at the sides of the tank beneath the floater 18, and a relatively freer flow in the center of the tank provided by reason of the partial trough 17. The partial flow at the sides of the tank prevents channeling, and, to that extent, prevents devitrification of the glass. Such structure insures a maximum glass flow at the center of the tank, in case a maximum flow at this point is desirable.

In accordance with the present invention, I am enabled to utilize a comparatively shallow glass bath while insuring the desired flow conditions from the melting chamber into the refining chamber, the bridge wall provided insuring the desired skimming or purifying action and permitting only that portion of the glass to pass into the refining chamber which possesses such attributes as to enable it to be worked in the desired manner. To those skilled in the art, it will be apparent that while I have illustrated a refining chamber of simple construction, this chamber may be modified to suit any desired working conditions, as, for example, by the addition of one or more gathering chambers or the like.

While I have herein illustrated and described certain preferred embodiments of my invention, it will be understood that changes in the constructions illustrated may be made without departing from the spirit of my invention or the scope of my broader claims.

I claim:

1. In a glass working apparatus, a tank including a melting chamber and a refining chamber, said tank being constructed to maintain the glass level so spaced from the general plane of the bottom as to provide a relatively shallow tank, and a bridge wall intermediate said chambers for effecting a skimming action and to prevent direct flow of surface glass into the refining chamber, said tank having a trough-like depression in the floor below said bridge wall, said bridge wall having a depth of submergence substantially equal to the depth of the trough whereby the passageway from the melting chamber to the refining chamber has a clearance beneath said bridge wall as great as the prevailing depth of the tank.

2. In a glass working apparatus, a tank characterized as to glass level as a relatively shallow tank, said tank including a melting chamber and a refining chamber, and a bridge wall intermediate said chambers for effecting a skimming action and to prevent direct flow of surface glass into the refining chamber, the portion of said bridge wall submerged beneath the glass level being above the general plane of the bottom of the tank, said tank having a trough-like depression in the floor below said purifying means and of sufficient depth to provide beneath said bridge wall a passage from the melting chamber to the refining chamber approximating in depth the prevailing depth of the tank.

3. In a glass working apparatus, a relatively shallow tank including a melting chamber and a refining chamber and a bridge wall intermediate said chambers for effecting a skimming or purifying action, said tank having a trough-like depression in the floor below said bridge providing a passage from the melting chamber to the refining chamber underneath said bridge wall at least as deep as the prevailing depth of the tank.

4. In a glass working apparatus, a relatively shallow tank including a melting chamber and a refining chamber and a bridge wall intermediate said chambers for effecting a skimming or purifying action, said tank having a trough-like depression in the floor below said bridge providing a passage from the melting chamber to the refining chamber underneath said bridge wall at least as deep as the prevailing depth of the tank, said depression having sloping side walls on opposite sides of the bridge wall.

5. In a glass working apparatus, a relatively shallow tank including a melting chamber and a refining chamber, and a bridge wall intermediate said chambers comprising angularly related floaters, said tank having a depression in its floor underlying said bridge wall and conforming in general contour to said angularly related floaters, said depression having a sufficient depth to provide beneath said bridge wall a passage from the melting chamber to the refining chamber approximating in depth the prevailing depth of the tank.

6. In a glass working apparatus, a relatively shallow tank including a melting chamber and a refining chamber and a bridge wall dipping into the glass intermediate said chambers for effecting a skimming action and to prevent direct flow of surface glass into the refining chamber, said tank having a trough-like depression in the floor below said bridge wall, the depth of the trough substantially equaling the depth of submergence of the bridge wall to make a passageway from the melting chamber to the refining chamber underneath said bridge wall as deep as the prevailing depth of the tank.

SAMUEL A. FORTER.